United States Patent
Masa et al.

(10) Patent No.: US 9,243,898 B2
(45) Date of Patent: Jan. 26, 2016

(54) POSITIONING DEVICE COMPRISING A LIGHT BEAM

(71) Applicant: CSEM Centre Suisse d'Electronique et de Microtechnique SA Recherche et Developpement, Neuchatel (CH)

(72) Inventors: Peter Masa, Onnens (CH); David Hasler, Neuchatel (CH); Eric Grenet, Neuchatel (CH); Ross Stanley, Epalinges (CH)

(73) Assignee: CSEM CENTRE SUISSE D'ELECTRONIQUE ET DE MICROTECHNIQUE SA RECHERCHE ET DEVELOPPEMENT, Neuchatel (CH)

(*) Notice: Subject to any disclaimer, the term of this patent is extended or adjusted under 35 U.S.C. 154(b) by 188 days.

(21) Appl. No.: 14/251,812

(22) Filed: Apr. 14, 2014

(65) Prior Publication Data

US 2014/0368836 A1    Dec. 18, 2014

(30) Foreign Application Priority Data

Apr. 15, 2013     (EP) .................................... 13163819

(51) Int. Cl.

| | |
|---|---|
| *G01B 11/14* | (2006.01) |
| *G01J 1/04* | (2006.01) |
| *G01S 3/781* | (2006.01) |
| *G01S 3/783* | (2006.01) |
| *G01S 5/16* | (2006.01) |

(52) U.S. Cl.
CPC ................ *G01B 11/14* (2013.01); *G01J 1/0437* (2013.01); *G01S 3/781* (2013.01); *G01S 3/7835* (2013.01); *G01S 5/16* (2013.01); *G01S 5/163* (2013.01)

(58) Field of Classification Search
CPC ...... G01C 15/002; G01B 11/14; G01B 11/16; G01N 2333/78; G01N 33/5026; G01N 33/5029; G01N 33/5061; G01N 33/5082; G02B 26/001; G02B 26/0833
See application file for complete search history.

(56) References Cited

U.S. PATENT DOCUMENTS

| | | | |
|---|---|---|---|
| 4,039,825 A | * | 8/1977 | Doyle ........................... 356/622 |
| 6,141,104 A | | 10/2000 | Schulz et al. |
| 2005/0105101 A1 | | 5/2005 | Duling et al. |

FOREIGN PATENT DOCUMENTS

| | | |
|---|---|---|
| WO | 9207281 A1 | 4/1992 |
| WO | 2012007561 A2 | 1/2012 |

OTHER PUBLICATIONS

European Search Report, dated Sep. 12, 2013, from corresponding EP application.

*Primary Examiner* — Michael P Stafira
(74) *Attorney, Agent, or Firm* — Young & Thompson

(57) ABSTRACT

A position measurement system for determining 2D displacement or position of a mobile element with respect to a reference frame, including: a point light; an optical mask having transparent and opaque areas defining a repetitive pattern on at least one side of its surfaces; an imager, fixed to a mobile element, including integrated electronic circuits allowing detection, computing and analyzing of a shadow projected by the optical mask. The position measurement system includes an optical diffuser plate between the light source and the mask. The imager, mask and diffuser plate form an assembly so as to produce a light spot created by the scattering of the incident light beam emitted by the light source on the diffuser plate. The mask positioned between the diffuser plate and imager, produces a shadow on the imager, allowing to compute and provide 2D position of the mobile element relative to the fixed reference frame.

17 Claims, 17 Drawing Sheets

POSITIONING DEVICE COMPRISING A LIGHT BEAM

TECHNICAL FIELD

The present invention relates to the field of metrology, in particular the field of absolute and relative positioning measurement devices or systems needing three or more degrees of freedom measurement systems such as multi-dimensional position encoders or specialised laser devices. Examples of such devices are position measurement systems for handling and assembly machines, scanning devices, pointing and optical tracking devices. The applications are very wide and are typical in the field of industrial equipments, optical instrumentation, medical devices, aerospace, automotive, telecommunication systems, astronomy, energy, geology, military.

In particular, the present invention relates to the field of absolute and relative position measurement devices wherein the typical measured position can change from some nanometers up to some meters. It also relates to positioning devices associated to measurement systems that measure with a very high accuracy the position and/or the displacement of mobile elements located at large distances, such as more than 1 km, with a submicron precision.

BACKGROUND OF THE INVENTION

A huge variety of positioning devices have been developed in the past and are used in different technical domains. In the metrology domain most positioning devices are based on encoding principles, using optical and magnetic rotary or linear encoders. The maximal precision of these devices are of the order of $\frac{1}{10}$ of a micron or $\frac{1}{10'000}$ of a degree for angular encoders. In most of the encoders types the sensing element is assembled close to the encoder element which is fixed to the object of which one wants to determine the linear or angular position. In situations wherein the position of an object has to be determined from a certain distance, lasers or other light sources are used to determine the position. Optical triangulation or interferometry for example are techniques used in a huge variety of configurations. These systems have fundamental drawbacks. Either they are simple and the possible resolution is not very high, typically 0.1 micron at most, or the resolution is very high, typically 1 nm, and the system therefore is very complex, cumbersome and very expensive.

In several situations such as encountered in the case of assembly and handling robots, several serial encoders might be needed to identify the position of the extremity of a mobile arm of the system. By combining different encoders, the errors of these encoders are added and the measurement precision is rarely better than half a micron. Also, it is not always evident to combine linear and rotational encoders in the same space allocated to perform the 3D position or movement of an object.

There exists in different technical fields an important need for a system that can measure with very high precision, typically sub nanometer, the 3D position and rotation of a moving element located at distances from the mm range up to the km range. It would be desirable that such a system would be compact, easy to install, cheap and also that the same concept can be used for relatively small distances, typically between 1 cm to several meters, up to very high distances greater than 1 km.

Masa et al. (patent PCT/EP2011/062104) discloses a system, called a shadow imager, which is based on the projection and analysis of a shadow. The system described in PCT/EP2011/062104 is inexpensive, easy to implement in a wide variety of geometries of positioning devices, and it allows to determine the change of the position of the light source with very high precision. It comprises one imaging device, typically a CMOS sensor, composed of an array of pixels sensitive to electromagnetic radiation, an optical mask composed of opaque and transparent regions and a light source, arranged so that the incident light on the optical mask projects a shadow on the sensor. The optical mask in the device described in PCT/EP2011/062104 comprises two optical patterns that act as an absolute a relative code in the shadow imaging system. As the light source can be attached to a moving element, the position of this moving element can also be determined with very high precision. The very high precision that can be obtained with a shadow imaging device is due to the fact that the repetitive pattern integrated on the mask is projected over the whole sensor, allowing as such much higher precisions than what can be obtained by the direct projection of a light spot on a detector array. In the case of a shadow imager it is also important to recognize that the shadow imaging detection method is insensitive to the light intensity. This fact leads to another big advantage for an optical positioning measurement system based on a shadow imaging system, because the intensity stability of the light source is not important, to the contrary of other systems based on direct light illumination on a detector array. The shadow imager can be constructed with different types of light sources, typically small lamps or preferably LED's and semiconductor lasers which can be easily fixed to moving elements. Also, as described in detail in PCT/EP2011/062104, by using several light sources and several imagers, one may realize configurations that allow to determine the 6 degrees of freedom of a moving element, i.e. the 3 cartesian coordinates and the 3 rotation angles.

It is an object of the invention to add an important improvement to systems based on a shadow imaging position measurement system.

SUMMARY OF THE INVENTION

To achieve this goal, the disclosed invention concerns a position measurement system for determining 2D, 3D displacement and/or rotation of a mobile element with respect to a fixed reference frame, comprising:
  a light source, typically a point light source, fixed on a reference frame;
  an optical mask, comprising transparent and opaque areas on at least one side of its surfaces, said areas define a repetitive pattern, said repetitive pattern is preferably a regular pattern and may comprise a distinctive element;
  an imager, typically a CMOS sensor, fixed to said mobile element, comprising integrated electronic circuits allowing detection, computing and analyzing of a shadow projected by the optical mask.

According to the invention, the system comprises also an optical diffuser plate positioned between said point light source and the optical mask. The imager, the optical mask and the optical diffuser plate form an assembly so as to produce a light spot created by the scattering of the incident light beam, emitted by the light source, on said optical diffuser plate. The optical mask, positioned in between said optical diffuser plate and said Imager, casts a shadow on the imager, by the light scattered from the light spot on the diffusing plate. The imager allows to compute and provide 2D, 3D position, displacement and/or rotation of the mobile element relative to the fixed reference frame.

In the proposed system the light source is a point light source, typically having a wavelength between 1 µm and 1.8 µm. The light source can have also a visible wavelength, preferably between 500 nm and 690 nm. Different types of light sources may be used in the present invention, such as a LED, a superluminous LED, and preferably a near infrared semiconductor laser having an emission wavelength between 640 nm and 1.2 µm.

In the proposed measurement system of the invention, the point light source is positioned to a distance typically greater than 10 times the distance between the optical diffuser plate and the Imager. The distance of the light source to the optical diffuser plate depends on the application and can be, typically for industrial applications, between 0.2 and 2 meter, preferably between 0.5 m and 1.5 meter. In some applications, such as for instance in the field of geology or space, the distance between the light source and imager can be greater than 100 meter, preferably greater than 1 km.

The position measurement system according to the invention can be realised in a great number of configurations wherein different types of optical components are implemented, such as mirrors, beam splitters or optical lenses. Mirrors and beam splitters can be used anywhere in the system in order to deviate or separate the local light beam, and optical lenses may be used to shape the light beam anywhere in the system. Optical lenses and mirrors may be used to expand the light beam or to focus or defocus said light beam. Mirrors or shutters can also be positioned anywhere in the system and can be used to switch off locally and temporarily the light beam. There is no limitation to the number, type and combination of optical components, such as prisms, polarisation elements, filters, gratings. Any optical element of the system may have an optical coating on at least a part of its surface. In all embodiments of the present invention it is important that the light beam produces a light spot on the optical diffuser plate.

For example, in one embodiment of the system of the invention, a mirror is inserted between the point light source and the optical diffuser plate. The optical diffuser plate, the optical mask and the imager may have any orientation angle relative to the incident laser beam on said mirror and may be positioned so that anyone of said optical diffusion layer, said optical mask and said imager does not intersect the light beam between the point light source and the mirror. In some configurations a second mirror may be used to direct the light beam on the diffusing plate. The proposed system can also be used to measure precisely the rotation angle of one of these mirrors.

In another embodiment, the emitted light beam is incident on an optical diffuser plate and the optical mask and the CMOS detector are both positioned off-axis relative to the light beam incident on the diffusing plate, and both are positioned to the incident light side of the optical diffuser plate, such that the optical mask does not intercept the light beam between the point light source and said optical diffuser plate.

It is also an object of the invention to use at least a second assembly comprising a second optical diffusion plate, a second optical mask and a second imager. In such an embodiment according to the invention, an optical beam splitter is positioned in front of the point light source, allowing to deviate a part of the emitted light beam towards said second assembly. The combination of the two said imagers allows to determine the 2D carthesian position, or displacement, and at the same time the two perpendicular rotation angles of the mobile element relative to the said frame. According to the invention, the beam splitter may have any spatial orientation relative to the incident light beam on the beam splitter so that the deviated light beam can make an angle, typically between 90 degrees and 180 degrees, with said incident light beam. A mirror can be provided to reflect the deviated light beam from the beam splitter, in order to direct the deviated beam to a second diffuser, optical mask and imager located anywhere in the system. Said mirror may be positioned adjacent to the point light source.

According to the invention, multiple mirrors can be positioned in the system, which allows to enhance considerably the light path and as such the sensitivity of the position measurement. The realization of a multiple reflected beam can be made before or after the incidence of the light beam on the beam splitter. The deviated light beam or the transmitted light beam by the beam splitter may undergo multiple reflections and may be combined by multiple reflections before incidence of the light beam on the beam splitter.

According to the invention, the system may comprise speckle reduction means.

In one embodiment the speckle reduction means comprises a vibration system attached to the diffusing plate. In another embodiment an acousto-optic system produces an oscillation of the light spot on the diffusing plate to reduce the speckle effect.

According to the invention it is also possible to combine and arrange at least two systems such as described in the invention. These separate systems may be assembled in the same device or in two separate devices under any relative angle varying between 0 and 180 degrees, preferably between 45 and 145 degrees, and more preferably between 80 and 100 degrees.

BRIEF DESCRIPTION OF THE DRAWINGS

The above described objects and advantages of the present invention will become more readily apparent to those ordinarily skilled in the art after reviewing the following detailed descriptions and accompanying drawings, in which.

DETAILED DESCRIPTION OF PREFERRED EMBODIMENTS

Figure 1:
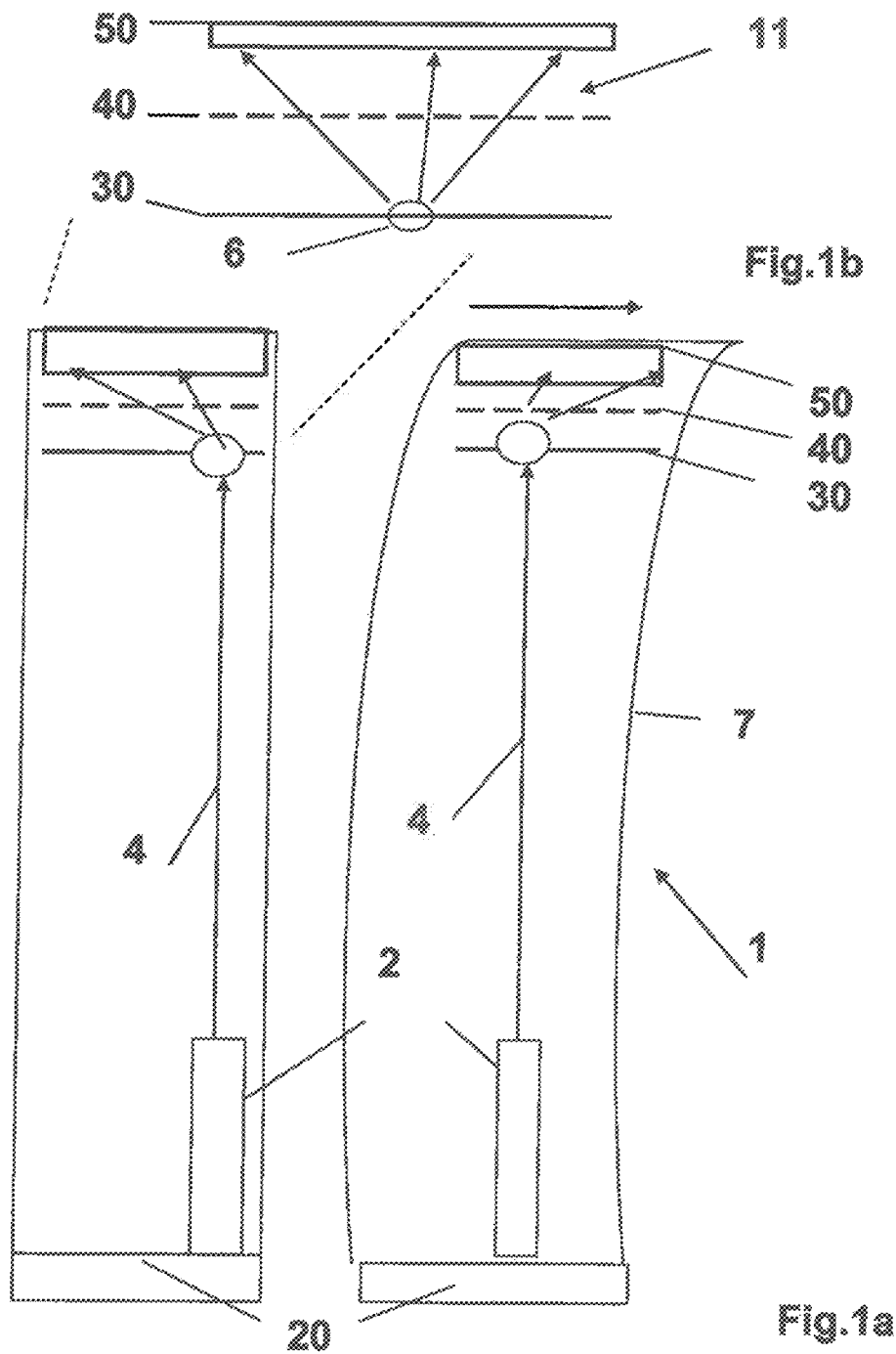
FIG. 1a illustrates a measurement system in its initial position and in its deformed position.
FIG. 1b shows a detailed view on an optical assembly comprising an optical diffuser plate, an optical mask and an imager

FIG. 1 illustrates the principle of the present invention of a position measurement system for determining 3D displacement and rotation of a mobile element with respect to a fixed reference frame 20. The proposed system 1 comprises, according to the invention:
- a point light source 2, preferably a point light source 2 fixed on a reference frame 20;
- an optical mask 40, comprising transparent and opaque areas on at least one side of its surfaces, said areas form a repetitive pattern; said repetitive pattern is preferably a regular pattern; the repetitive pattern may comprise a distinctive element; said distinctive element may be arranged to define a 2 dimensional absolute code; as another example, said distinctive element may be the absence of a portion, such as a point or dot, of said regular pattern; said distinctive element is useful in situations wherein the displacement of the shadow pattern is greater that the distance between the shadow elements produced by the elements of said repetitive pattern;
- an imager 50, typically a CMOS sensor, fixed to said mobile element, comprising electromagnetic light detection elements and integrated electronic circuits allowing detection, arranged to compute and analyze a shadow projected by the optical mask 40.

According to the invention, the system 1 comprises also an optical diffuser plate 30 positioned between the point light source 2 and the optical mask 40. The imager 50, the optical mask 40 and the optical diffuser plate 30 are fixed relative to each other and form an optical assembly 11 so as to produce a light spot 6 created by the scattering of the incident light beam 4 projected by the light source 2 on the optical diffuser plate 30. The optical mask 40, positioned in between the optical diffuser plate 30 and the Imager 50, produces a shadow on the Imager 50, allowing to compute and provide 2D, 3D position, displacement and/or rotation of the mobile element or mobile part of the mechanical housing 7 of the device, relative to the fixed reference frame 20.

For reasons of clarity of understanding the following wordings used in the present application are defined explicitly:
- "incident light side" means the surface of an element on which light is incident;
- "in front of" means the side towards the incident light;
- "front surface" means the surface of an element to the side of the incident light.
- "optical assembly" 11 is defined as being a mechanical assembly of said optical diffuser plate 30, said optical mask 40 and said Imager 50, and in which optical assembly 11 these three elements 30,40,50 may have any spatial orientation angle relative to each other and in which said elements remain in a fixed position relative to each other.

FIG. 1 shows the concept of a preferred embodiment of the invention which consists of the improvement of a shadow imager by adding an optical diffuser plate 30 in front of and close to an optical mask 40. It can be easily understood that the proposed system 1 as described in the invention, in function of the dedicated application, may be realized according to different configurations described hereafter.

Figure 2:
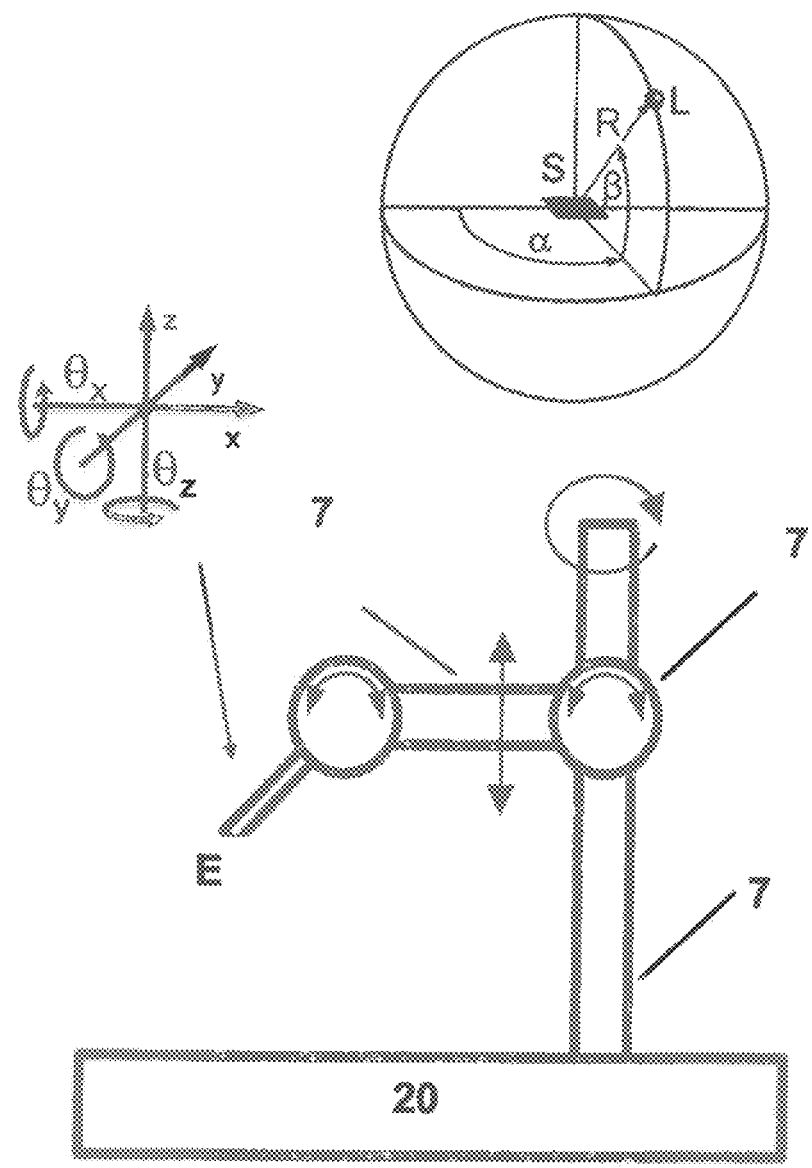
FIG. 2 shows a mechanical alignment and handling system.
Figure 4:
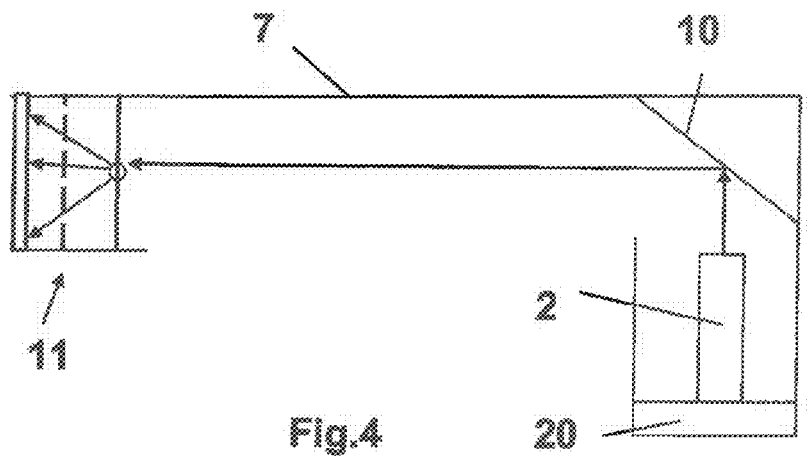
FIG. 4 illustrates a system with a deflected beam in an open mechanical construction.

In a preferred embodiment, a system 1 is assembled inside a mechanical housing 7, which may be a tube, such as one of the hollow shafts as illustrated in FIG. 2, and wherein the light source 2 is fixed to one end of the tube and wherein the optical assembly 11 is fixed to the other extremity of the tube or housing 7. FIG. 1a illustrates the effect of the movement of the extremity of the housing 7 in which the optical assembly 11 is fixed. The housing 7 comprises a fixed reference frame 20 to which the light source 2 is assembled and fixed. It is obvious, as only relative position variations are detected, that the same system 1 may also be used to detect the movement of the light source 2 when the optical assembly 11 is kept fixed to a reference frame. The invented system 1 does not need to be fixed entirely inside a closed tube or housing 7 but can also be assembled in a mechanical construction that comprises at least one opening, and may include additional optical elements such as a mirror 10 to deflect the light beam 4 as illustrated in FIG. 4.

Figures 3A, 3B:
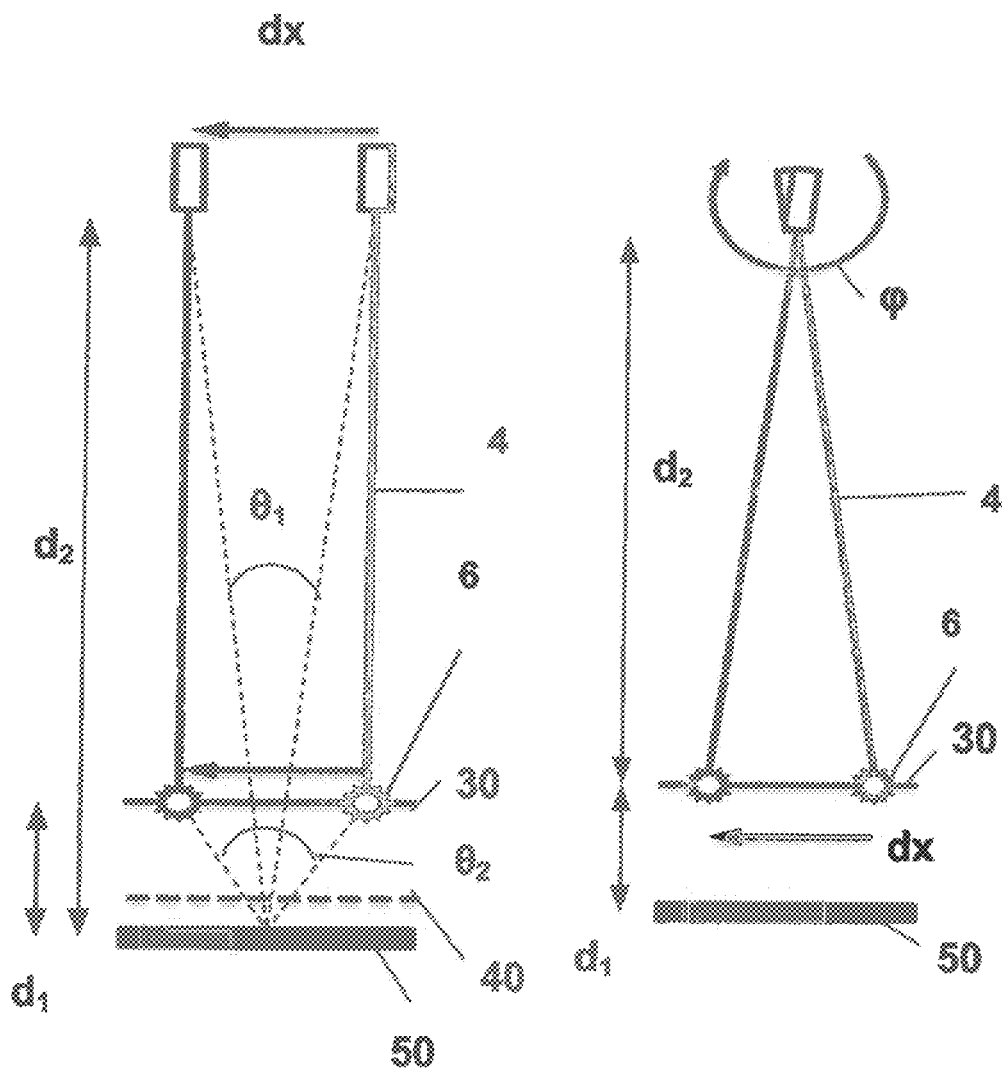
FIG. 3a illustrates the effect of the displacement of a point light source of the system.
FIG. 3b illustrates an obtainable angular resolution.

The advantage of using an optical diffuser plate 30 in the optical assembly 11, according to the invention, is visualized FIG. 3a which illustrates the effect of a change in displacement dx of the light source 2 relative to the imager 50. FIG. 3a illustrates that in a shadow imaging system without optical diffuser 30, a change of angle θ1 is detected and that in the case of adding an optical diffuser plate 30 to a shadow imaging system, a change of angle θ2 is detected. The gain in measurement sensitivity is thus θ2/θ1 which is, as illustrated in FIG. 3a, proportional to d2/d1, wherein d2 is the distance between the light source 2 and the optical diffuser plate 30 and d1 the distance between the optical diffuser plate 30 and the imager 50. According to the invention, the typical gain obtained by a light source 2 placed at 1 m is about 100 times and the gain of a light source 2 placed at a distance of 1 km is a factor of 100,000 relative to a shadow imaging system without optical diffuser plate 39. FIG. 3b illustrates the absolute angle precision that can be obtained by the proposed system of the invention. A shadow imager can achieve a precision of about 1 nm of the displacement of a light source. Thus, by placing a light emitting source 2 at large distance d2 one can achieve an angle precision of $d\phi=dx/d_2$ wherein dx is the displacement of the light spot 6. In the case of $d_2=1$ km, the angle precision $d\phi$ is thus $10^{-9}$ m/1000 m or $10^{-12}$ rad. The following table 1 summarizes the comparison of a shadow imaging system 1 with and without optical diffuser plate 30 in the optical assembly 11.

TABLE 1

Comparison of position and rotation precision that can be obtained, in a carthesian reference system (x, y, z/θx, y, z as shown in FIG. 2) and in an azimuth-elevation reference system (R/α, β; as shown in FIG. 2, with R the distance between light source (L) 2 and the imager (S) 11), by a shadow imaging system 1 comprising ("sCLASER") or not comprising ("sCclassic") an optical diffuser plate 30 in the optical assembly 11. In the table the wording "n.a." means non available from the measurement system. Sensitivitites for z and R are rated as very good (+++) to weak (−).

|  | precision | sensor-to-L distance | | | |
| --- | --- | --- | --- | --- | --- |
|  | of L position | 0.01 [m] | 0.1 [m] | 1 [m] | 1000 [m] |
| sC classic | x, y | 5e−2 μm | 5e−1 μm | 5 μm | 5e+3 μm |
|  | θx, y | n.a. | n.a. | n.a. | n.a. |
|  | z | +++ | ++ | + | − |
|  | θz | n.a. | n.a. | n.a. | n.a. |
|  | α, β | 1 μrad | 1 μrad | 1 μrad | 1 μrad |
|  | R | +++ | ++ | + | − |
| sC LASER | x, y | 5e−3 μm | 5e−3 μm | 5e−3 μm | 5e−3 μm |
|  | θx, y | 0.1 μrad | 1e−2 μrad | 1e−3 μrad | 1e−6 μrad |
|  | z | n.a. | n.a. | n.a. | n.a. |
|  | θz | n.a. | n.a. | n.a. | n.a. |
|  | α, β | 0.1 μrad | 1e−2 μrad | 1e−3 μrad | 1e−6 μrad |
|  | R | n.a. | n.a. | n.a. | n.a. |

By adding the optical diffuser plate 30 in the optical assembly 11 one can thus extend the metrological performances from the mm range to the km range and sub micrometer linear displacements and prad ($=10^{-12}$ m) angular displacements can be detected.

By adding an optical diffuser plate 30, angular precision scales proportionally with the distance, to the contrary of the constant precision that is obtained by an optical assembly composed of only a light source, an optical mask and an imager.

Also, with the system 1 proposed in the current invention, the smallest detectable linear displacement remains constant by changing the distance d2 between light emitter 2 and imager 50, while in an optical assembly without optical diffuser 30, the smallest detectable linear displacement is proportional to the distance d2 between the light source 2 and the imager 50. Long range limits of the system 1 are due to refraction or air turbulences, so the best performances of the proposed system of the invention for long range applications are obtained in systems under vacuum or in space.

The system 1 proposed in the invention is easy to implement, is cheap and has very high precision. FIG. 2 shows a typical configuration in which the system 1 as described in the invention may be implemented and shows an example of a positioning system wherein the position of the extremity E of a moving arm has to be determined relative to a base or reference frame 20. In this particular example the housing 7 is a hollow tube of the positioning system 1.

Figure 5:
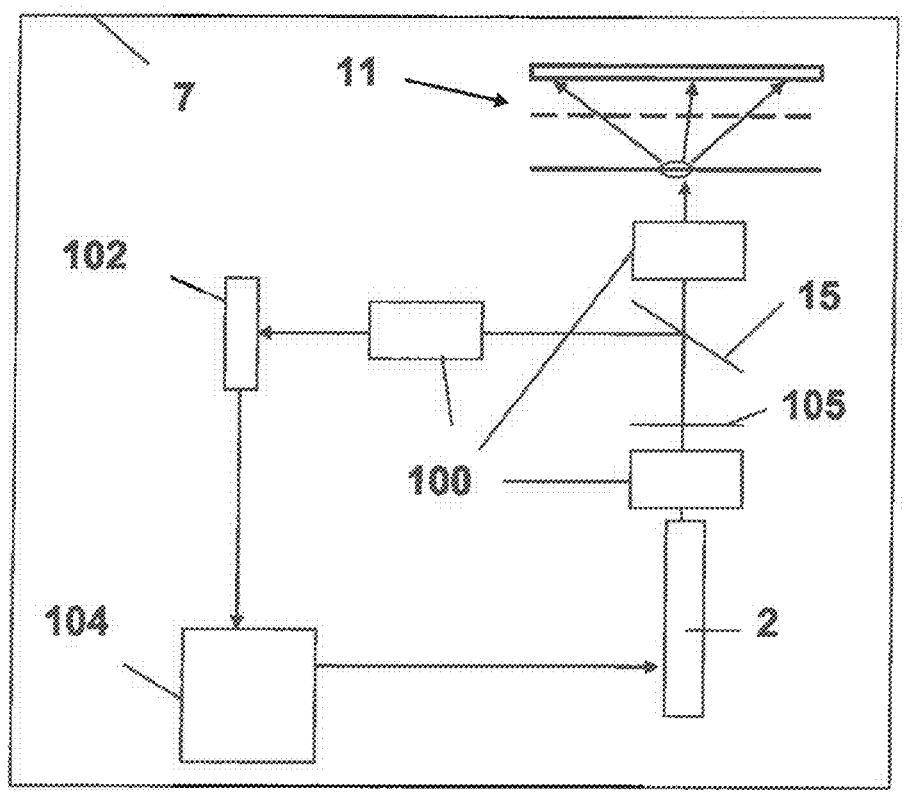
FIG. 5 illustrates different optical elements inserted in the path of the light beams of the system.

The tremendous precision that can be obtained by the invented simple system 1 can have a wide variety of applications such as, but not limited to:
  measuring columns
  laser trackers
  3D scanners
  parallel kinematics
  robots
  laser beam deflection measurement systems
  direct laser writing
  lasers on manufacturing
  satellite positioning
  optical communication
  inclinometers
  sub nm laser north finding applications
  autocollimators
  measurement of rotation axes In another embodiment of the invention, as illustrated in FIG. 5, the system comprises additional passive and/or active optical elements 100 inserted anywhere in the system 1, such as, but not limited to:
  an obturator 105, allowing to block temporarily any light beam of the system;
  a switchable mirror 15 to deviated any light beam of the system to a light detector 102 that is used as a component of the system that allows to monitor and/or to control the intensity level of the light source 2, by means of an electronic control system 104 using the output signal of the detector 102;
  a component that shifts transversally a light beam of the system, such as, but not limited to, a prism;
  a beam shaping device allowing to change the shape and divergence of a light beam in the system;
  an optical modulator that changes or modulates the intensity of a light beam of the system;
  a wavelength filter;
  a polarization sensitive element such as a polarizer, a half wave plate, a quarter wave plate or any birefringent component;

According to the invention, and in function of the specific application, any combination of the mentioned added optical elements 100 may be used, as far as said combination is used to change the direction, the shape, the intensity or polarization of a light beam anywhere in the system 1.

Figure 6:
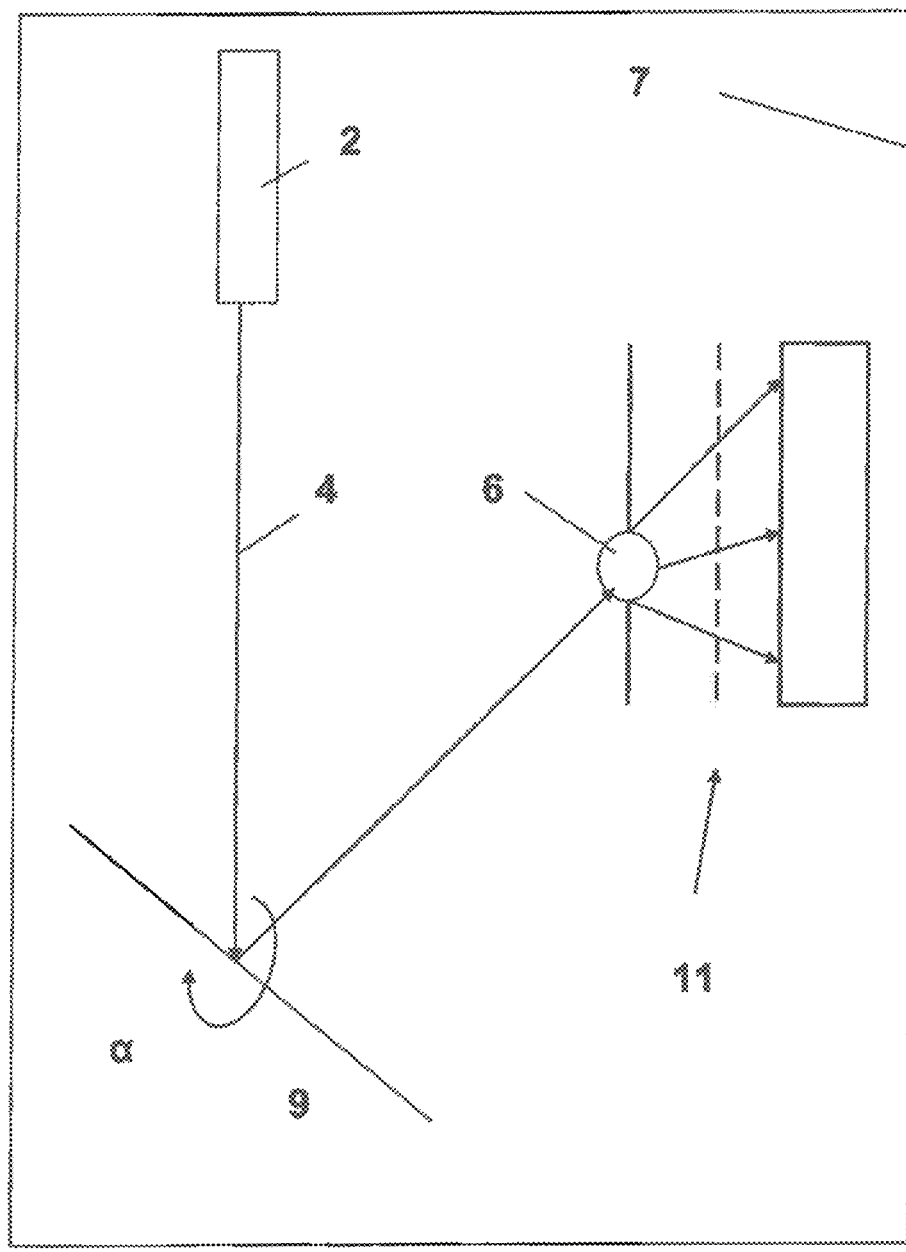
FIG. 6 illustrates a system including a mirror to deviate the light beam.

FIG. 6 illustrates another embodiment according to the invention wherein the light beam 4 is deviated to the optical diffuser plate 30 of the optical assembly 11 by using a mirror 9 fixed in front of the point light source 2. The use of a mirror 10 to deviate the optical beam can be necessary in function of the geometry of the mechanical housing in which the measurement system is build in. In some cases it can be necessary to use at least two mirrors 9, 10 to reflect and direct the emitted light beam 4 to the optical diffuser plate 30 of the optical assembly 11, as illustrated in FIG. 7.

Figure 7:
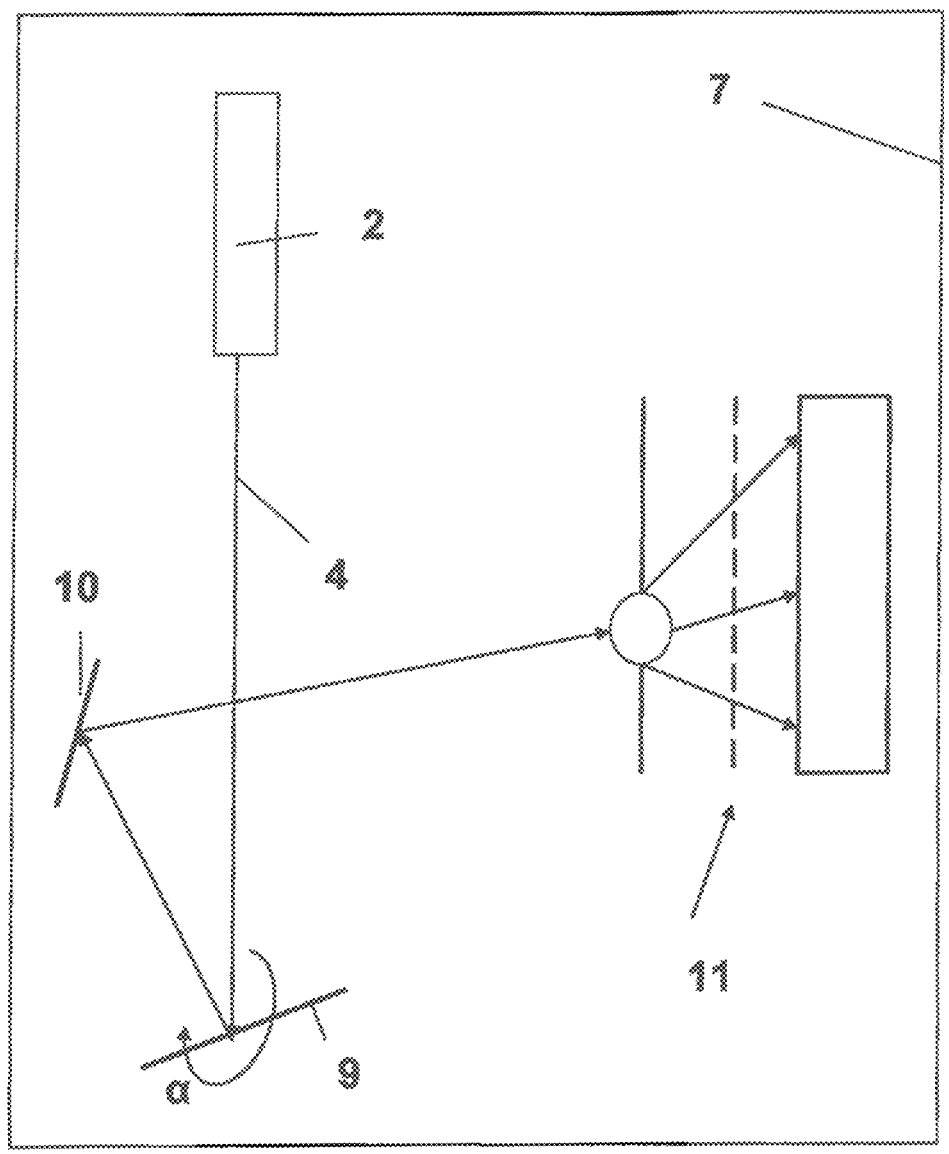
FIG. 7 illustrates another system including two mirrors to deviate the light beam.

In another embodiment of the invention, as illustrated also in FIG. 6 and FIG. 7, at least one of the mirrors 9 and 10 can be moved around any axis α located in the plane of the mirror. A configuration using more than one mirror can be used in several situations. In one example one of the mirrors 9-10 mirror is used to switch the reflected light beam from the optical diffuser plate 30 to another location in the system, for example to a detector 102, as illustrated in FIG. 5, to measure the light intensity of a light beam. In another embodiment the point light source 2 and the optical assembly 11 are both fixed relative to a reference frame 20 and the system is used to determine the rotation angle θ of a rotating mirror 10. In such a case the measurement system as described in the invention is used as a shaft encoder of a rotation system. The rotating mirror 10 can in that case be fixed on a shaft, or the shaft itself can have an advantageously chosen shape, comprising at least one flat reflecting surface 10 that is used as the rotating mirror 10.

Figure 8:
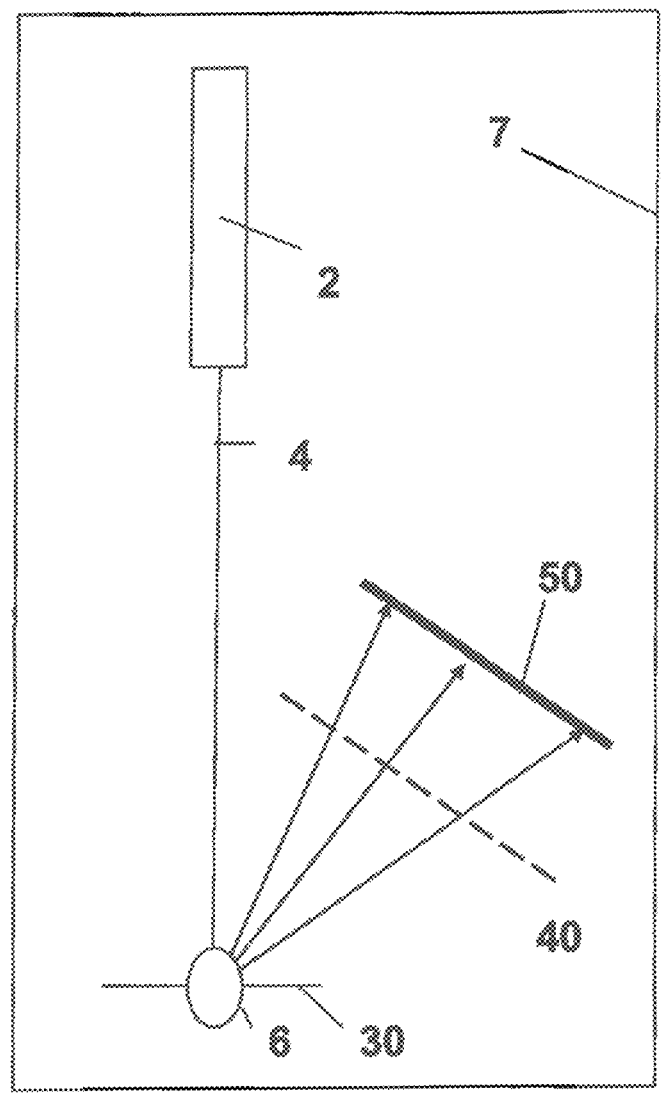
FIG. 8 illustrates an incident light beam incident on an optical diffuser plate and an optical mask and Imager, both positioned off-axis relative to the emitted light beam.

In another embodiment, illustrated in FIG. 8, the emitted light beam 4 is incident on an optical diffuser plate 30, and the optical mask 40 and the CMOS detector 50 are both positioned off-axis relative to the light beam 4 incident on the optical diffuser plate 30, and both are positioned to the incident light side of the optical diffuser plate 30, such that the optical mask 40 does not intercept the light beam 4 between the point light source 2 and said optical diffuser plate 30.

In a system comprising a single optical assembly 11, comprising a single Imager 50, it is necessary to know in advance how the mechanical system will move or will be deformed. In some mechanical systems it will be known for example that the extremity of which position is to be measured moves in a plane without additional rotational movement, and in other systems it will be known that the system moves according to at least one rotation axis and in that case the system may measure that rotation. In other systems using a single imager 50 one can measure one linear movement and one rotation.

Figure 9:
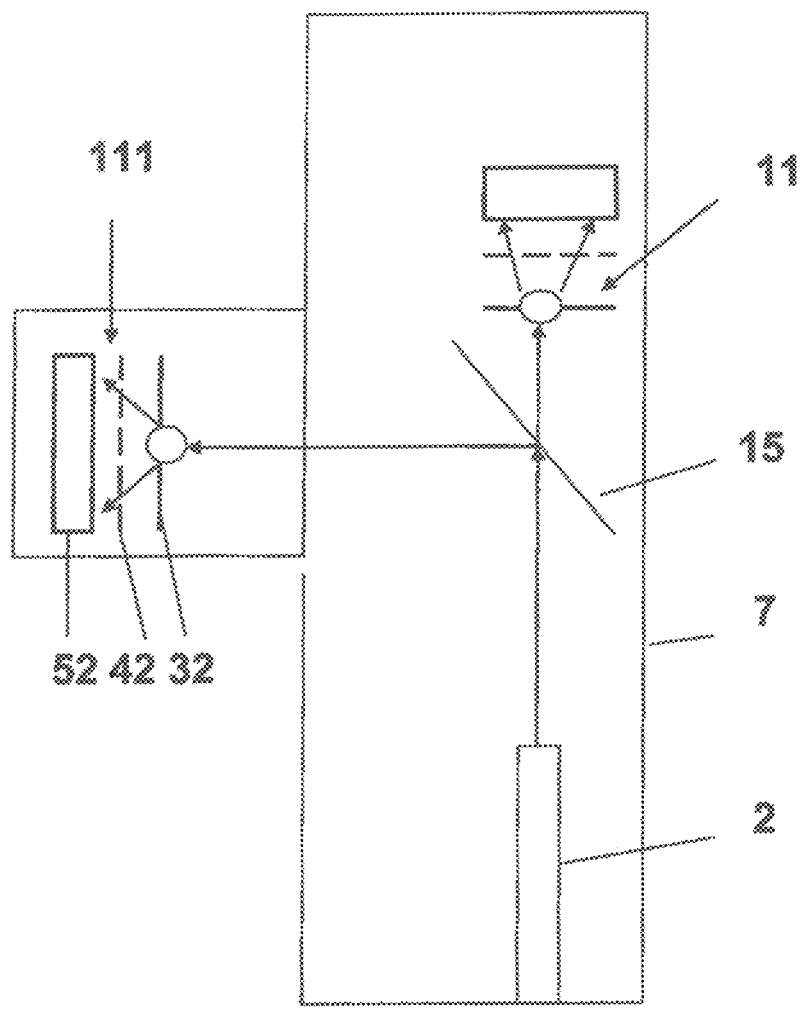
FIG. 9 illustrates a system comprising a beam splitter and 2 Imagers.
Figure 10:
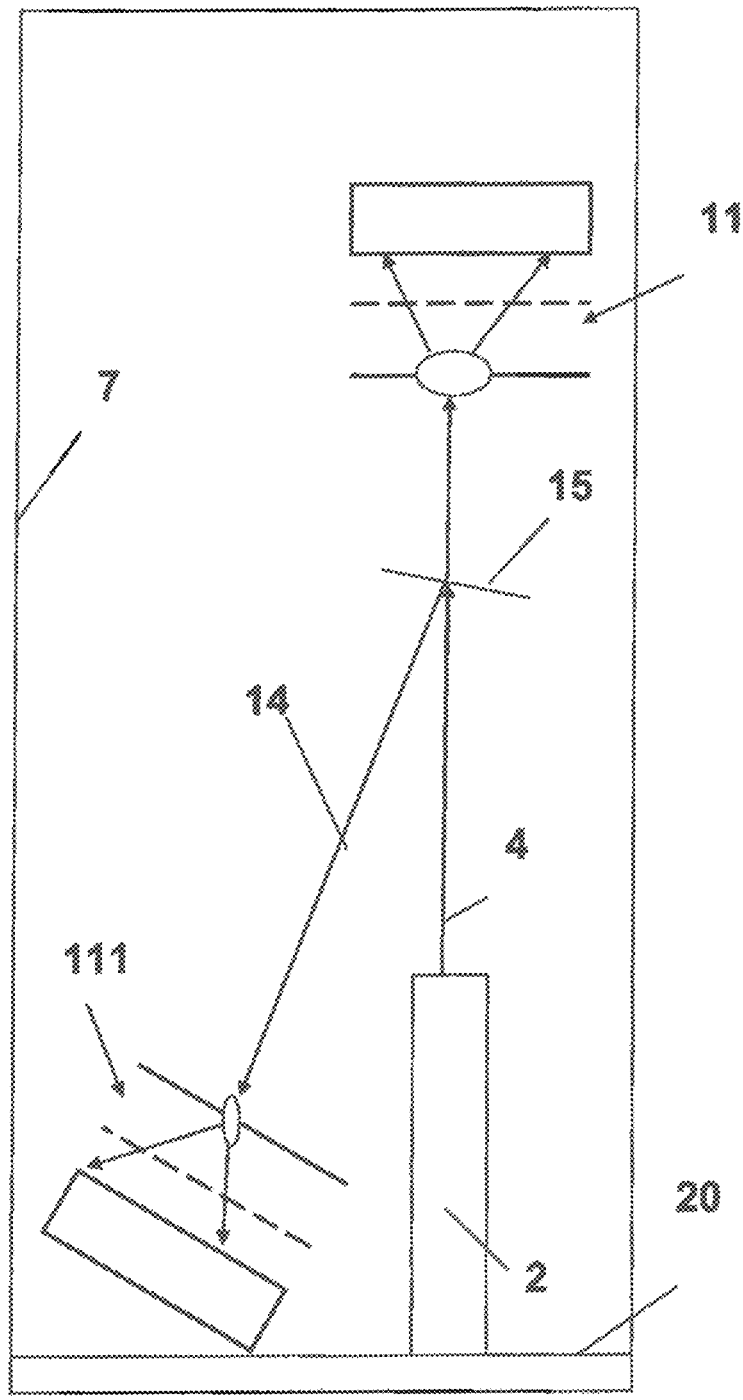
FIG. 10 illustrates another system comprising a deviated light beam and a second optical assembly positioned in proximity of the light source.

A drawback in the use of a system based on a single imager 50 is the fact that it is not possible to distinguish at the same time a 2D carthesian movement of the said mobile element and a flexure or rotation of the light source 2 relative to the reference frame 20. This limitation can be solved by an embodiment of the system 1 wherein an optical element 15 is used to separate the emitted optical beam 4 in two parts. FIG. 9 illustrates such an embodiment. A beam splitter 15 is used to separate the emitted optical beam 4 in two parts. A typical beam splitter is realized by a metalized glass plate, but other types of beam splitters may be used as well, preferably a wedged glass plate. One part of the optical beam 4 is transmitted through the beam splitter 15 to a first optical assembly 11 and another part 14 of the optical beam 4 is deviated to a second optical assembly 111 comprising a second optical diffuser plate 32, a second optical mask 42 and a second imager 52. By using a system wherein the emitted optical beam 4 is separated in two beams and by directing the produced two light beams onto two optical assemblies 11 and 111, it is possible to combine the signals provided by the two imagers 50, 52 of these assemblies to determine the carthesian movement of the mobile element as well as the flexure or rotation of the light source 2 relative to the reference frame 20, by solving two pairs of equations with each two variables. In a variant to this embodiment the beam splitter 15 may direct the light to a second assembly 111 positioned adjacent to the light source 2, as illustrated in FIG. 10.

Figure 11:
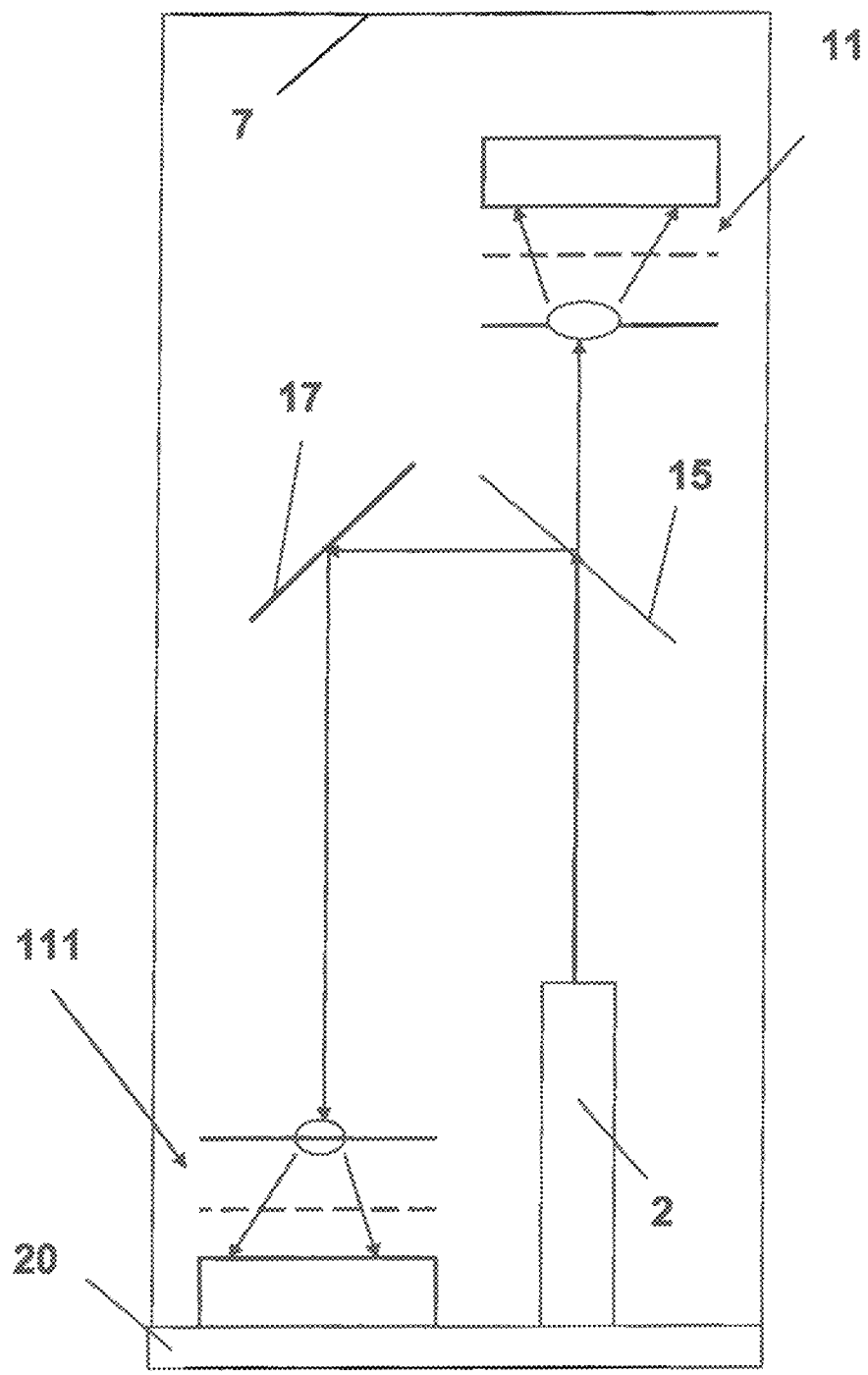
FIG. 11 illustrates a system comprising a beam splitter and a mirror to reflect a deviated beam to a second optical assembly positioned in proximity of the light source.
Figure 12:
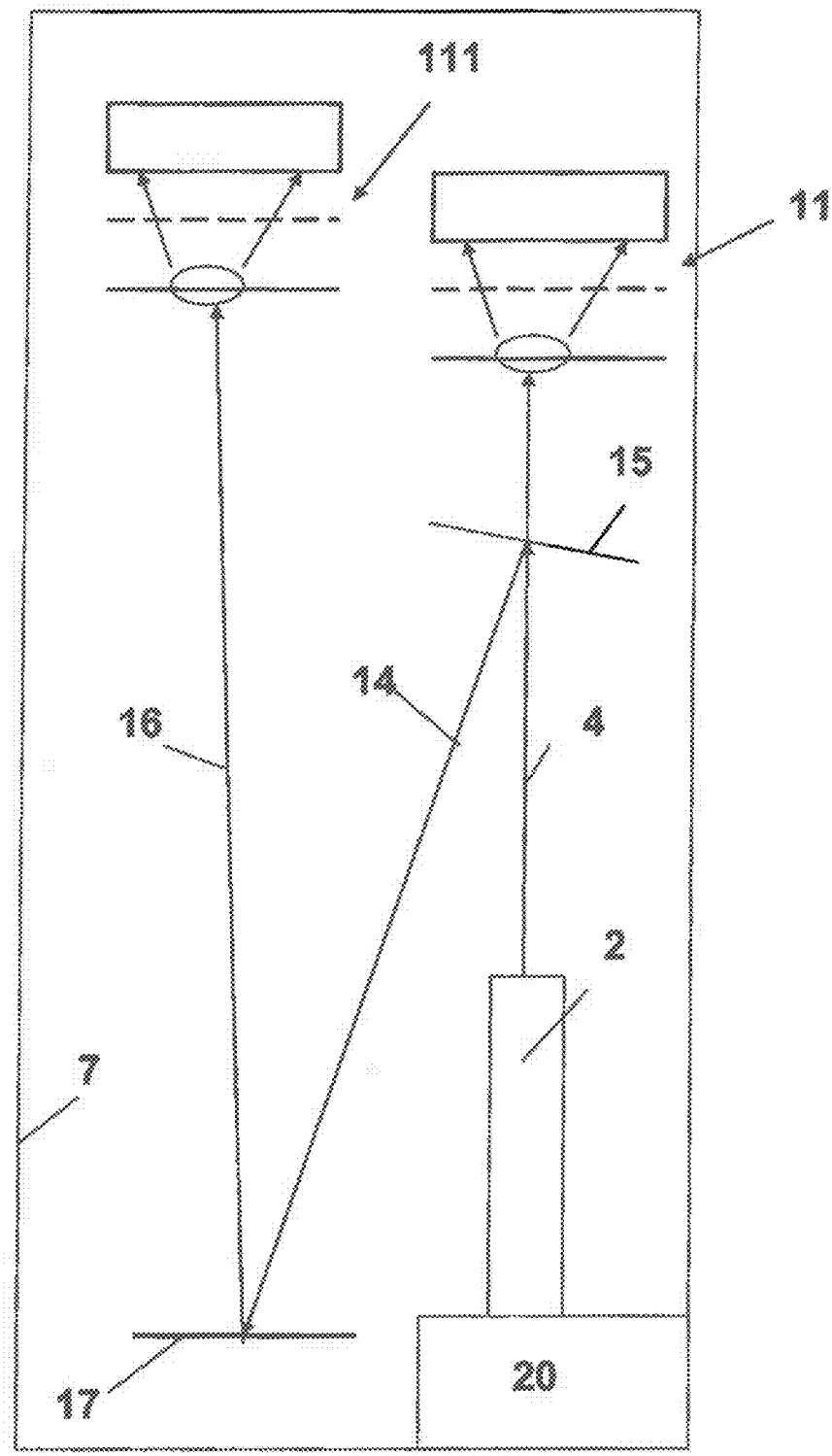
FIG. 12 illustrates a system comprising a beam splitter and a mirror to reflect a deviated beam to a second optical assembly positioned in proximity of the first optical assembly.
Figure 13:
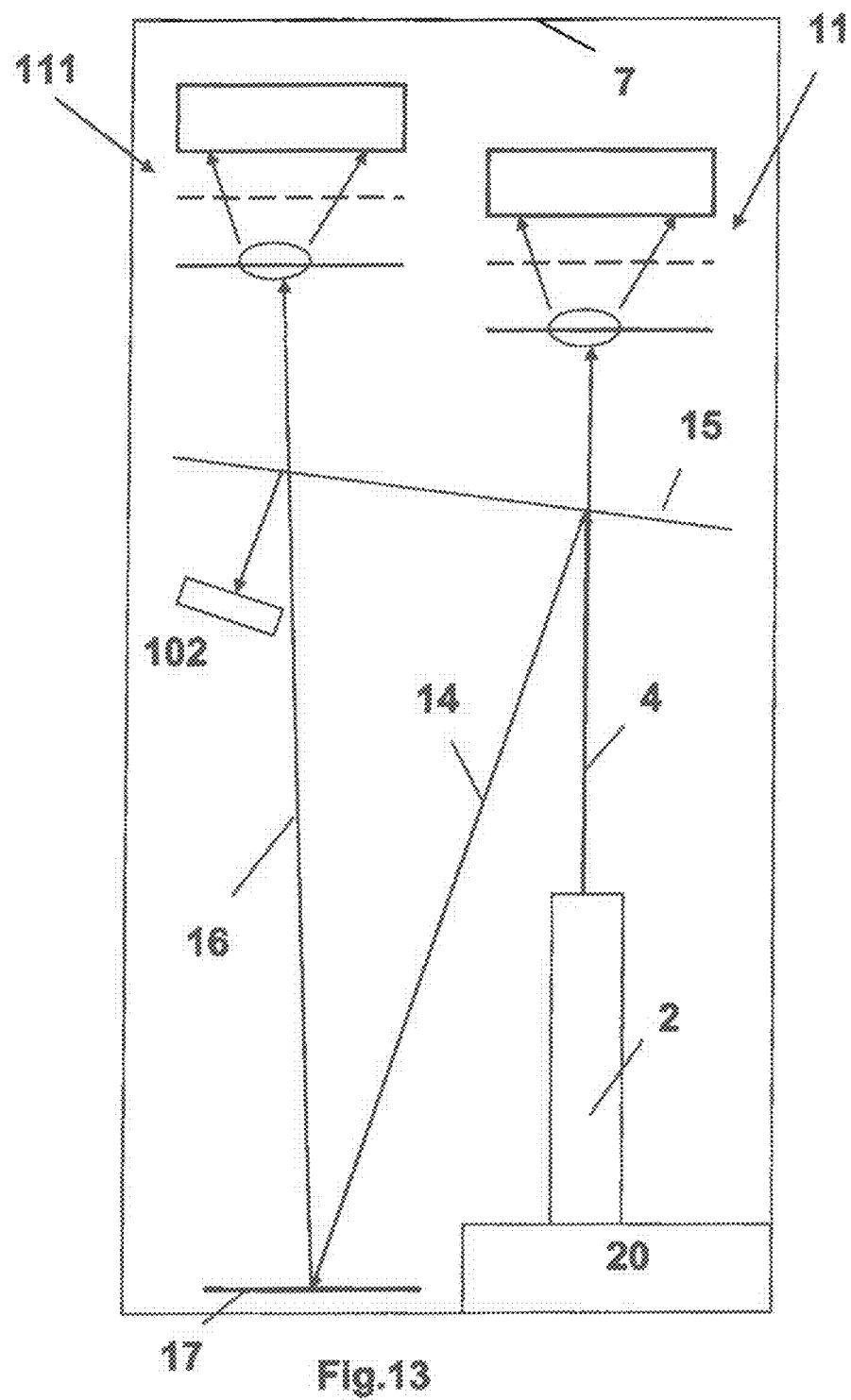
FIG. 13 illustrates another system comprising a beam splitter and a mirror to reflect a deviated beam to a second optical assembly positioned in proximity of the first optical assembly.

In another embodiment of the preceding described system comprising a beam splitter 15, at least one mirror 17 can be added in the path of the deviated light beam 14, in order to direct said deviated light beam 14 to a second optical assembly 111 positioned anywhere in the system 1. FIG. 11 and FIG. 12 illustrates two variants of the embodiment in which a second optical assembly 111 is positioned adjacent to the emitting light source 2 and respectively adjacent to the first optical assembly 11. In yet another embodiment of a system comprising a beam splitter 15, illustrated in FIG. 13, the deviated beam 14 from the beam splitter 15 is reflected by a mirror 17 and the reflected beam passes through the same beam splitter 15, which allows to use the second reflected partial beam 16 from that beam splitter 15 for the measurement of the intensity variation of the light beam 16 and/or the light source 2 by projecting said partial reflected light beam 16 to an optical detector 102.

Figure 14:
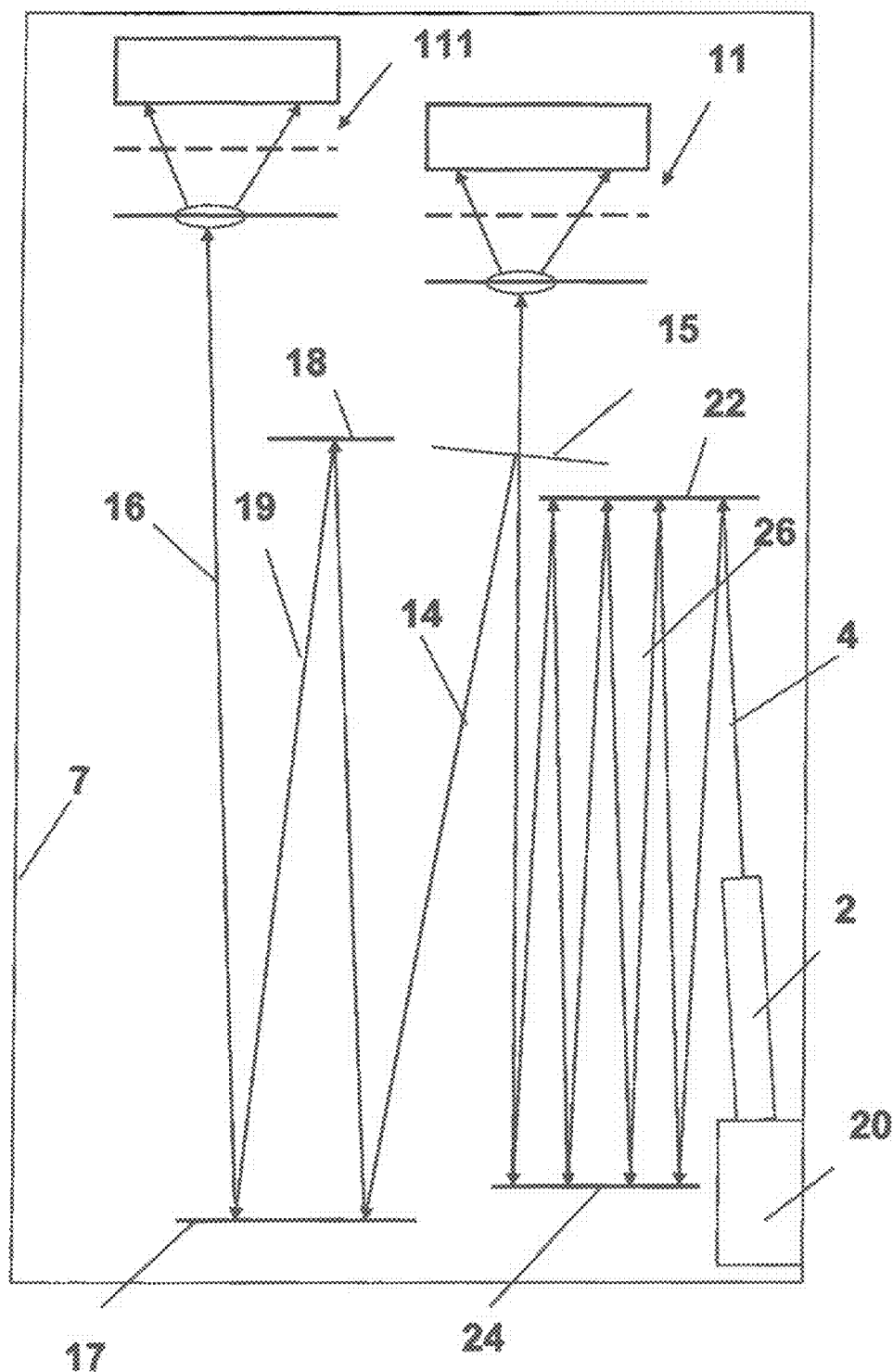
FIG. 14 illustrates a system with two mirrors in front of the emitted light beam to produce multiple reflection before incidence of the light beam on a beam splitter and another two mirrors positioned in the deviated light beam by the beam splitter to produce multiple reflections of that beam.

In another embodiment of the system, at least two mirrors can be used to enhance the propagation length of the light beam. Two mirrors 17, 18 can be placed in an advantageously chosen position to realize multiple reflections 19 of the deviated beam 14 from the beam splitter 15 as illustrated in FIG. 14. In another embodiment, multiple reflections 26 are produced by at least two mirrors 22-24 placed in the emitted beam 4 of the point light source 2 as illustrated in FIG. 14. It should be obvious to the person skilled in the art that multiple reflected beams can be produced in different ways and with different configurations and that the described embodiments using multiple reflected beams can be combined together. For example, it is possible to realize a multiple reflected beam before the light beam impinges on the beam splitter 15 and realize also multiple reflections of the transmitted or the deviated light beam from the beam splitter 15.

It is to be understood that all previously described embodiments can be combined or modified in the spirit and scope of the invention. For example an emitted light beam 4 may undergo multiple reflections before incidence on a beam splitter and the deviated beam from this beam splitter may be directed, similar to the configuration illustrated in FIG. 8, to an optical diffuser plate 30, and the light spot 6 created on the optical diffuser plate may cast, by the optical mask 40, a shadow on the imager 50 that is positioned off axis relative the incident beam on the diffusing plate.

Figure 15:
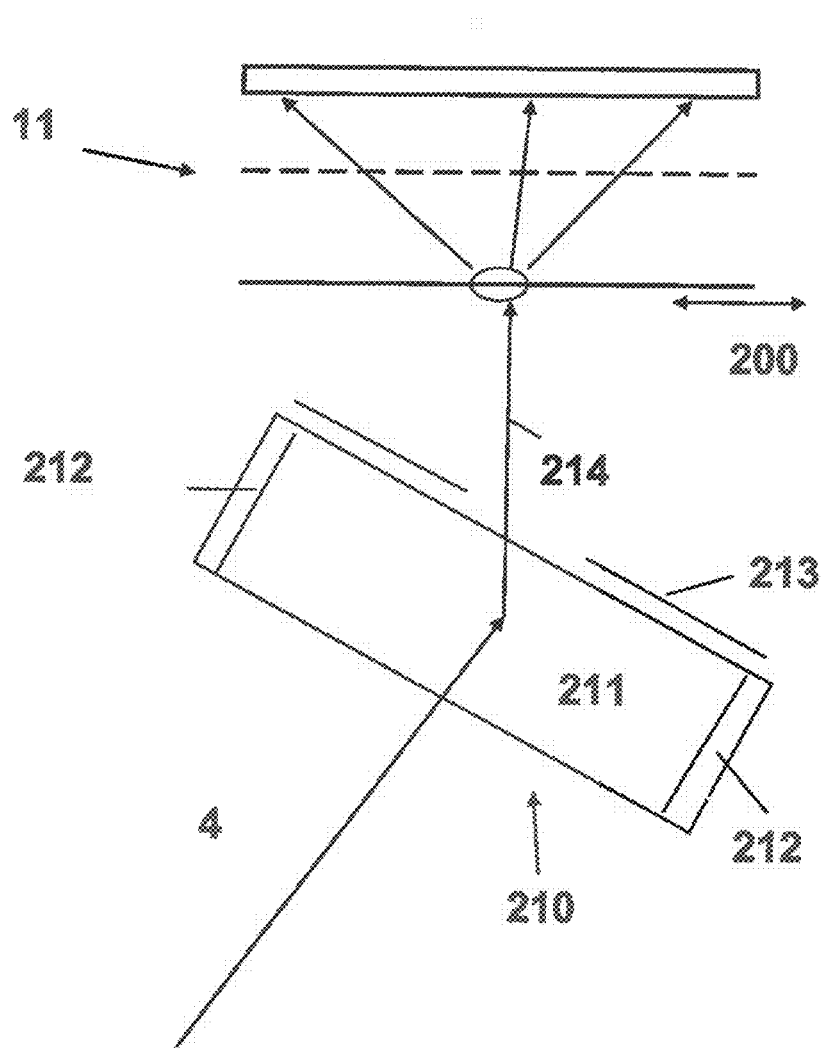
FIG. 15 shows means to vibrate the optical diffuser plate and means to oscillate the light spot produced on the optical diffuser plate.

In another embodiment of the system 1, means are provided to reduce the speckle effect produced by a coherent light source, for example a laser. There are several known methods to reduce the speckle effect, for example by inserting a rotating optical diffuser disc. In one embodiment, a vibration system 200 is attached to the optical diffuser plate 30, allowing this plate to vibrate in the direction of its plane 200. Another way to reduce the speckle effect is to make the light spot 6 oscillate. This can be achieved for example by using an acousto optical modulator 210 placed in the incident beam 4 on the optical diffuser plate 40 as illustrated in FIG. 15. The acousto-optic modulator is realized by a transparent plate 211 to which lateral piezoelectrical transducers 212 are fixed allowing to deviate the incident beam 4 according to a diffraction angle. The modulator comprises also a diaphragm or pinhole 213 to assure a high quality beam 214 directed to the optical assembly 11.

It should be obvious to a person skilled in the art that the use of a super luminous LED allows also to reduce the speckle effect and that this type of LED may be combined, to improve the speckle reduction effect, with the mentioned speckle reduction means.

Figure 16:
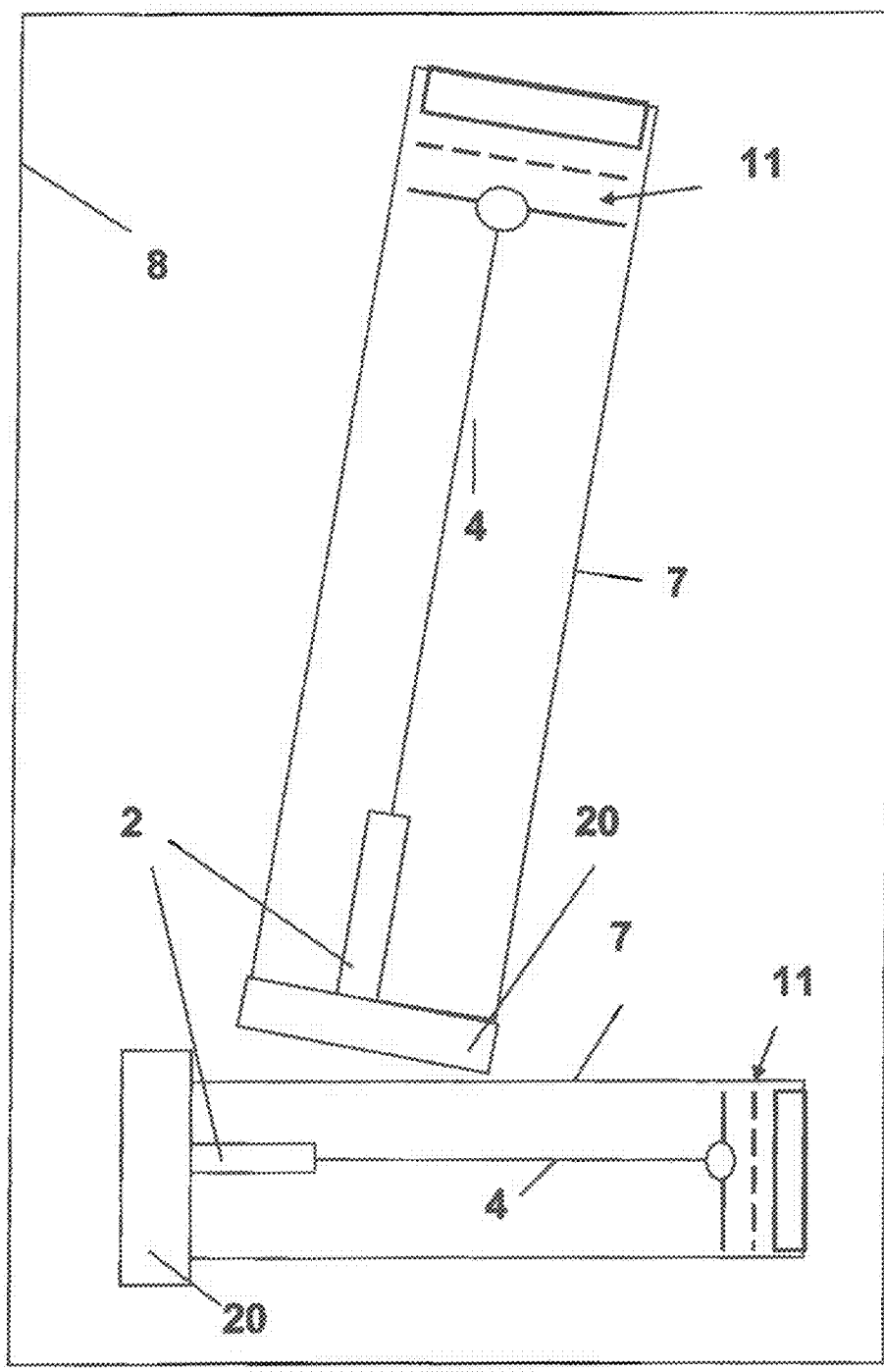
FIG. 16 shows a device comprising two systems assembled together
Figure 17:
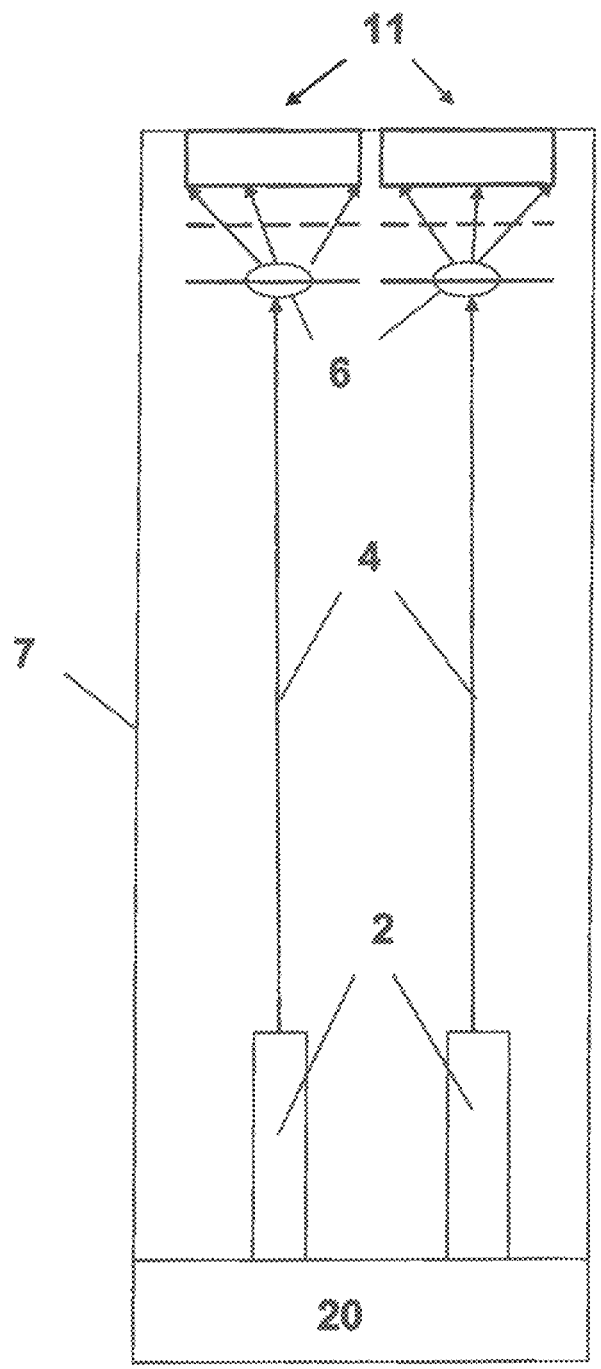
FIG. 17 shows a system comprising an optical assembly and two light sources.
Figure 18:
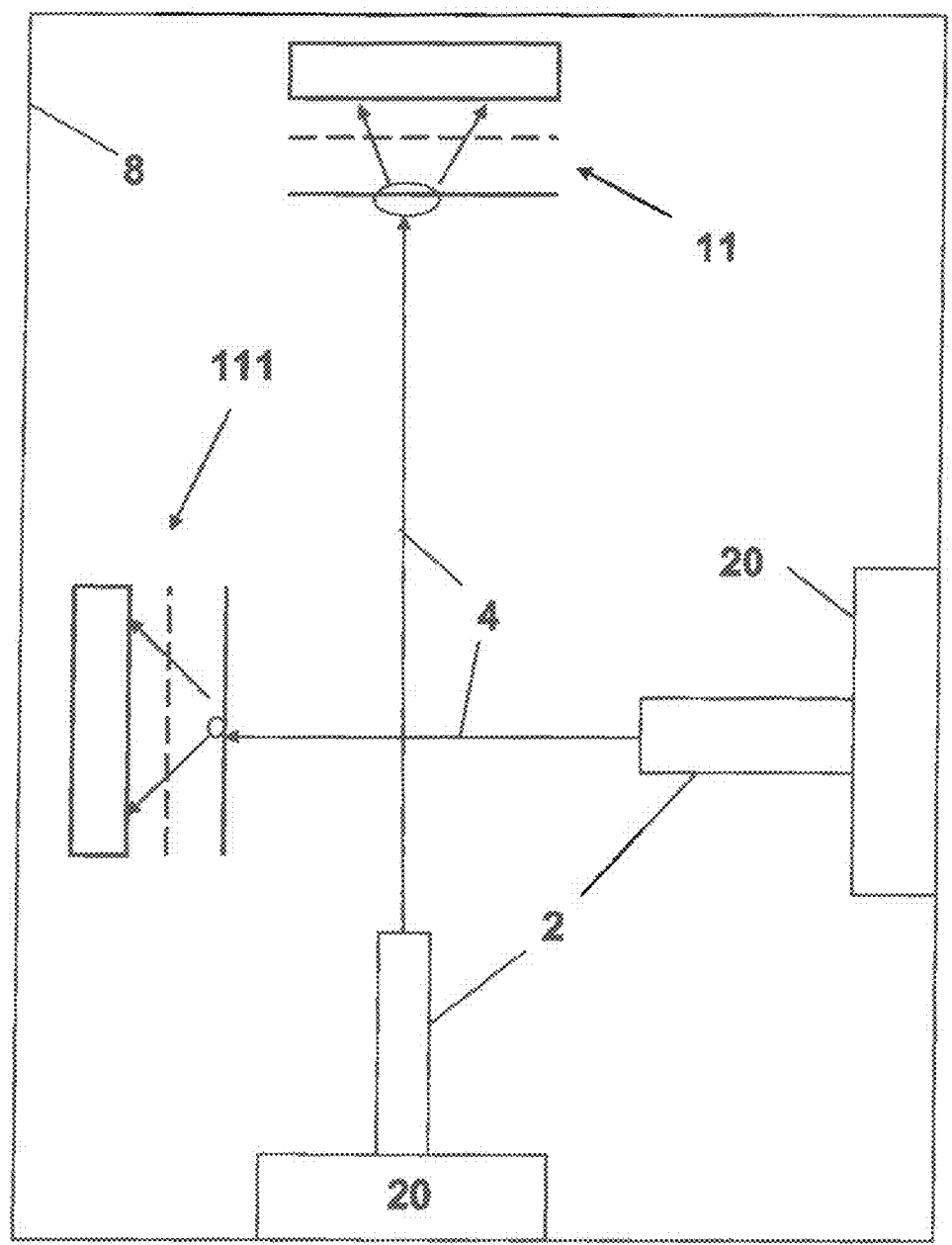
FIG. 18 shows a system comprising two optical assemblies and two crossing emitted light beams.

According to the invention it is also possible to combine and arrange in a single device 8 at least two systems such as described in the invention. The combination of several systems 1 in a single device 8 can have different benefits. First, it can improve the measurement accuracy. Secondly, a redundant measurement or reference measurement can be made, Third, a system 1 can, in some configurations be incorporated inside the reference frame 20 to assure that the geometry of said reference frame 20 has not changed. A combination of these benefits can also be important in some applications of the invention. In one embodiment at least two systems 1 may be assembled in a device 8, with any relative angle between the two systems 1 varying between 0 and 180 degrees, preferably between 45 and 145 degrees, and more preferably between 80 and 100 degrees. A device 8 comprising two systems 1 is illustrated in FIG. 16. In another embodiment of the invention a device 8 may comprise, in a single housing 7, two systems 1 as illustrated in FIG. 17 In another variant of such an embodiment, illustrated in FIG. 18, the beams 4 of the two light sources 2 are crossed and are directed to two separate optical assemblies 11.

It will be appreciated that those skilled in the art will be able to device various arrangements that, although not explicitly described or shown herein, embody the outlined principles of the invention and which are included in the spirit and scope of the invention as defined in the claims of the present invention.

The invention claimed is:

1. A position measurement system for determining 2D displacement or position of a mobile element with respect to a reference frame, comprising:
   a point light source fixed to a reference frame, said point light source being arranged to emit a light beam;
   an optical mask, comprising transparent and opaque areas on at least one side of its surfaces, said areas defining a repetitive pattern; and
   an imager, fixed to a mobile element, comprising integrated electronic circuits allowing detection, computing and analyzing of a shadow projected by the optical mask,
   wherein said position measurement system comprises an optical diffuser plate positioned between said point light source and the optical mask and wherein the imager, the optical mask and the optical diffuser plate form an assembly, said light beam producing a light spot created by the scattering of an incident light beam emitted by the point light source on said optical diffuser plate, and
   wherein said optical mask, positioned in between said optical diffuser plate and said imager, produces a shadow on said imager, said imager being arranged to compute and provide 2D position of the mobile element relative to the fixed reference frame.

2. The position measurement system according to claim 1, wherein said repetitive pattern comprises a distinctive element.

3. The position measurement system according to claim 1, wherein the point light source is a super luminous LED or a Laser.

4. The position measurement system according to claim 1, wherein the point light source is positioned to a distance d2 greater than 10 times the distance d1, the distance d1 being the distance between the optical diffuser plate and the imager.

5. The position measurement system according to claim 4, wherein said distance d2 is between 0.2 meter and 2 meter, preferably between 0.5 meter and 1.5 meter.

6. The position measurement system according to claim 4, wherein said distance d2 is greater than 100 meter, preferably greater than 1 km.

7. The position measurement system according to claim 1, wherein at least one first mirror is inserted between the point light source and said assembly, and wherein the optical diffuser plate, the optical mask and the imager of said assembly may have any orientation angle relative to the incident laser beam on said first mirror and positioned so that anyone of said optical diffuser plate, said optical mask and said imager does not intersect the light beam between the point light source and said first mirror.

8. The position measurement system according to claim 7, arranged to measure the angular position of said first mirror, wherein said first mirror can be rotated in reference to a rotation axis located in the plane of said first mirror.

9. The position measurement system according to claim 1, arranged to determine the 2D cartesian position, or displacement of said mobile element, and at the same time determining the rotation of the point light source relative to the reference frame, comprising a second assembly comprising a second optical diffuser plate, a second optical mask and a second imager, and wherein an optical beam splitter is positioned in front of the point light source and deviates part of the emitted light beam on said second assembly.

10. The position measurement system according to claim 9, wherein a second mirror is positioned between the beam splitter and said second assembly.

11. The position measurement system according to claim 10, wherein said second mirror is positioned adjacent to the point light source, and wherein said second mirror is used to direct said deviated light beam on the optical diffuser plate of said second assembly and such that the reflected light beam provided by said second mirror does not intersect said beam splitter.

12. The position measurement system according to claim 11 wherein a third mirror is positioned adjacent to the beam splitter, allowing to realize multiple reflections of the light beam between said second and said third mirror, enhancing as such the sensitivity of the position or rotation detection of the second imager.

13. The position measurement system according to claim 9, wherein at least a fourth mirror and a fifth mirror are positioned between the point light source and the beam splitter, in order to realize multiple reflections of the light beam before said light beam intersects the beam splitter, and enhancing as such the sensitivity of the position or rotation detection of the two imagers.

14. The position measurement system according to claim 1 wherein the system comprises speckle reduction means.

15. The position measurement system, according to claim 14, wherein said speckle reduction means comprises a vibration system attached to the optical diffuser plat.

16. The position measurement system, according to claim 14, wherein said speckle reduction means comprises an acousto-optic system positioned in the emitted light beam.

17. The position measurement system according to claim 2, wherein the point light source is a super luminous LED or a Laser.

\* \* \* \* \*